United States Patent [19]

Lee

[11] Patent Number: 4,830,092
[45] Date of Patent: May 16, 1989

[54] HEAT ENHANCERS AND SALT PURIFIERS FOR THERMAL ENERGY STORAGE CANISTER

[75] Inventor: William T. Lee, Canoga Park, Calif.
[73] Assignee: Rockwell International Corporation, El Segundo, Calif.
[21] Appl. No.: 923,441
[22] Filed: Oct. 27, 1986
[51] Int. Cl.⁴ ............................................. F28D 21/00
[52] U.S. Cl. ......................................... 165/1; 165/10; 126/400; 126/436; 60/641.8
[58] Field of Search ............. 126/436, 400; 165/10 A, 165/1; 60/614.8

[56] References Cited

U.S. PATENT DOCUMENTS

| | | | |
|---|---|---|---|
| 2,778,610 | 1/1957 | Bruegger | 257/262.19 |
| 3,029,596 | 4/1962 | Hanold et al. | 165/10 A X |
| 3,036,818 | 5/1962 | Legrand | 257/246 |
| 3,903,699 | 9/1975 | Davis | 165/10 A X |
| 3,960,207 | 6/1976 | Boer | 165/10 A |
| 4,200,148 | 4/1980 | Friefeld et al. | 165/10 A |
| 4,528,978 | 7/1985 | Robinson | 126/438 |

Primary Examiner—Margaret A. Focarino
Attorney, Agent, or Firm—H. Fredrick Hamann; Harry B. Field; David C. Faulkner

[57] ABSTRACT

A solar collector thermal power system 10 which includes thermal energy storage units (22) containing thermal energy storage canisters (28) with the associated heat enhancers and purifiers. A fluid is directed through the canisters to heat a phase change salt contained therein, which stored heat may later be utilized such as in a space station heat engine.

3 Claims, 5 Drawing Sheets

HEAT ENHANCERS AND SALT PURIFIERS FOR THERMAL ENERGY STORAGE CANISTER

BACKGROUND OF THE INVENTION

1. Technical Field

This invention relates generally to solar collector thermal power systems and is directed specifically to thermal energy storage units containing thermal energy storage canisters.

2. Background of the Prior Art

Various solar power systems have previously been proposed to meet electrical power or propulsion requirements of spacecraft, satellites and the space station.

A solar rocket absorber for use in outer space that heats a liquid by solar energy and outputs the heated fluid to a thruster is disclosed in U.S. Pat. No. 4,528,978 to Robinson dated July 16, 1985.

A thermal storage assembly which is charged by direct solar radiation and subsequently extracts the stored heat from the assembly utilizing a separate heat transfer fluid is disclosed in pending U.S. patent application Ser. No. 905,536 filed Sept. 10, 1986, titled "Solar Energy Focusing Assembly and Storage Unit", incorporated herein by reference. However, construction designs of heat fluid storage and conduit systems as well as thermal conductivity characteristics thereof have underscored the need for systems possessing enhanced structural integrity and improved heat transfer properties.

DISCLOSURE OF THE INVENTION

The present invention provides thermal energy salt storage canisters which can be utilized in a solar thermal power system.

Each of the thermal energy storage canisters include a longitudinal housing, an internal thermally conductive member passing lengthwise of the housing and attached proximate each end thereof. The member is further provided with longitudinally spaced radially extending fins affixed to the outer surface thereof. These spaced fins define a series of compartments within the longitudinal housing in which a phase change salt is retained.

It is an object of the present invention to provide thermal energy salt storage canisters which can be utilized in a collector thermal power system.

Another object of the present invention is to provide thermal energy salt storage canisters designed and constructed of a select metal or alloy to enhance the structural integrity thereof.

Yet another object of the present invention is to provide thermal energy salt storage canisters having improved heat transfer properties.

These and other objects and features of the present invention will be apparent from the following detailed description when considered in connection with the accompanying drawings.

DETAILED DESCRIPTION

Figure 1:
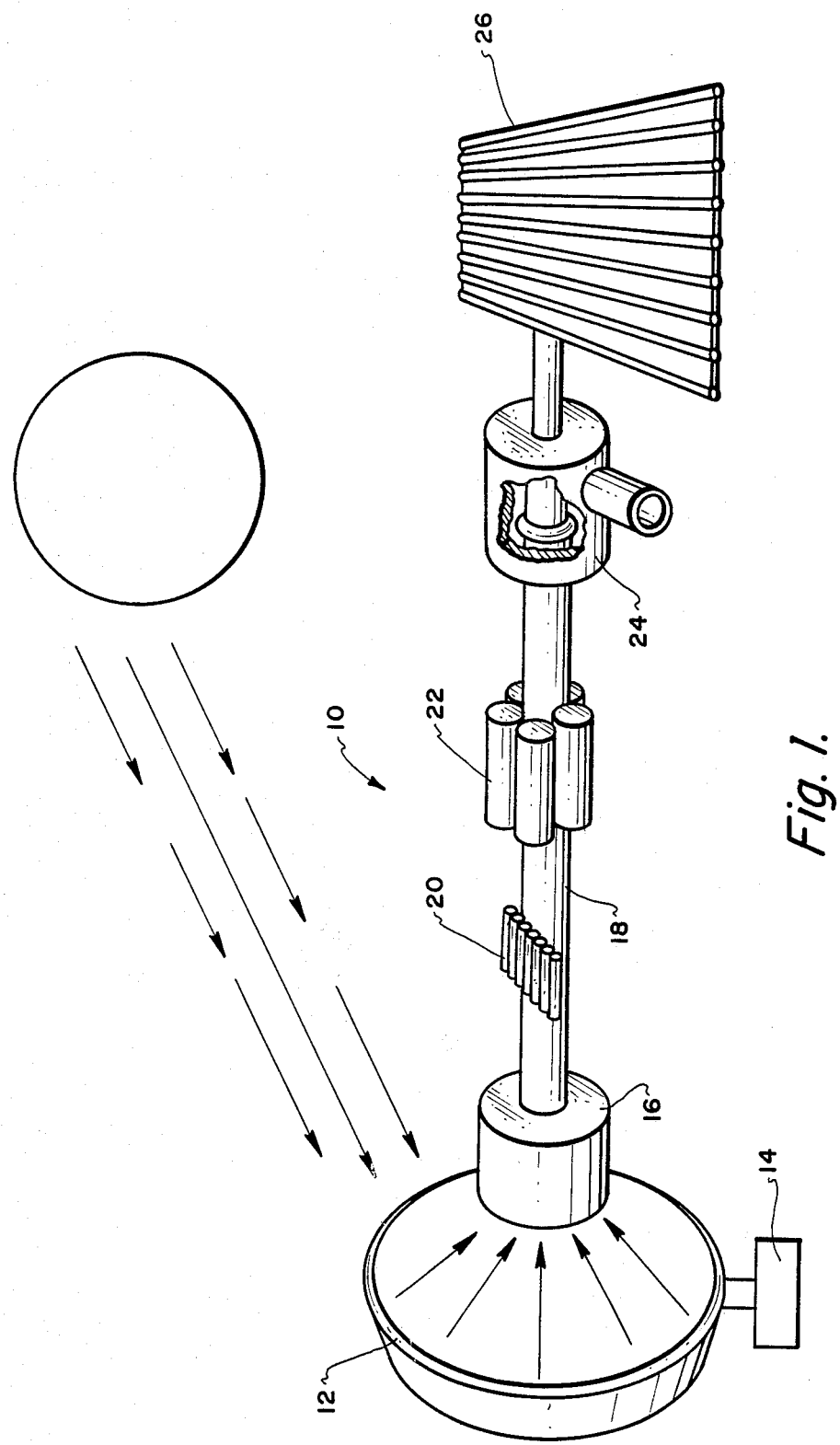
FIG. 1 is a perspective view of a space-based solar collector thermal power system incorporating thermal energy storage canisters according to the present invention within the system's thermal energy storage units.

Referring now to the drawings and more particularly to FIG. 1, there is shown a space-based solar collector thermal power system 10. The power system incorporates a solar radiation collector 12 including an orientation system 14 and receiver 16. The radiation collector and receiver are functionally coupled or integrated with a heat pipe (or heat exchanger) 18 having associated therewith a power control radiator 20, thermal energy storage units 22 and a Vuilleumier cooler 24. The cooler 24 is in turn associated with a waste heat radiator 26.

Figure 2:
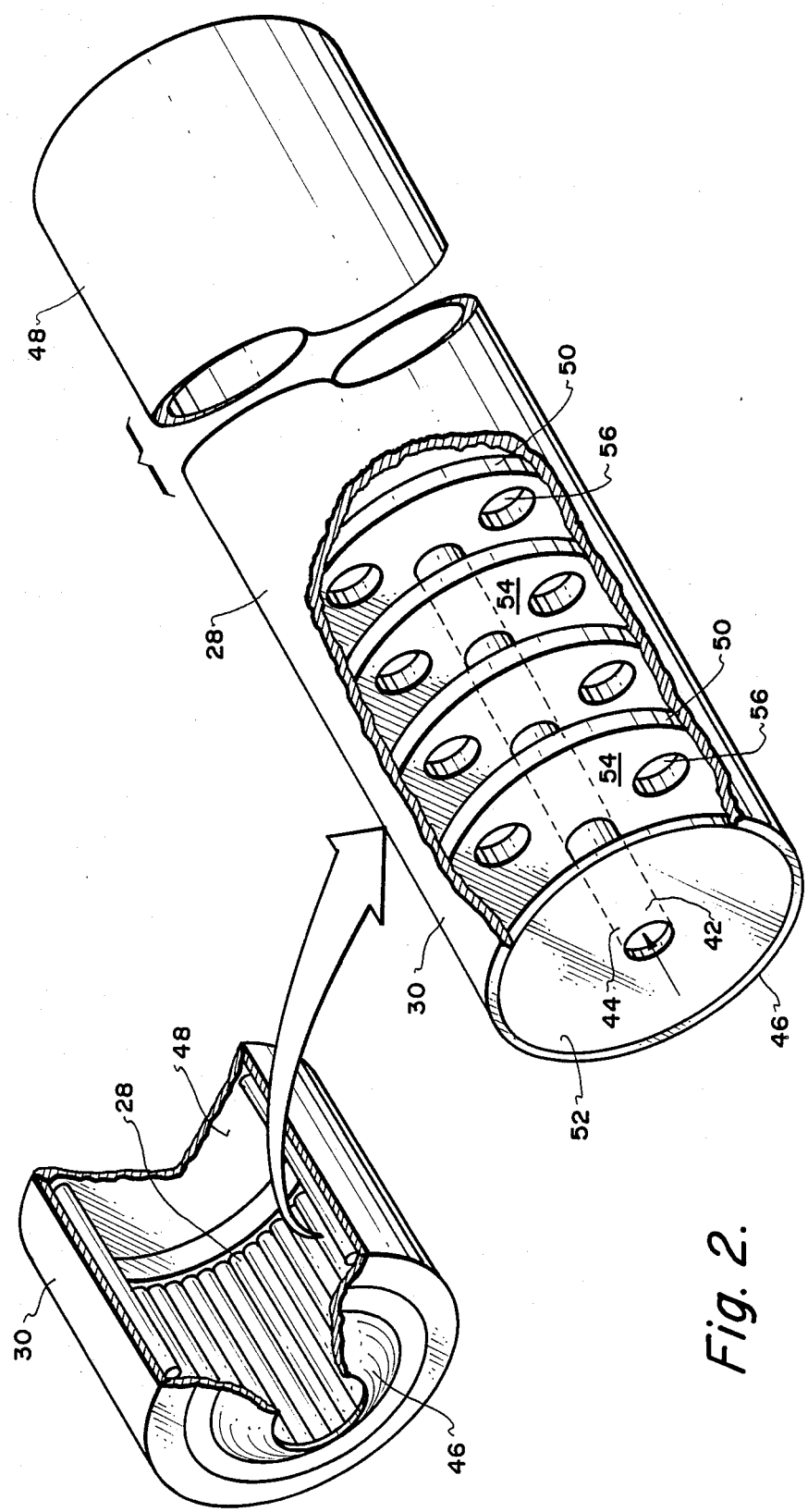
FIG. 2 is a partial cross-sectional view of one of the thermal energy storage units depicting a thermal energy storage canister.

The thermal energy storage units 22 contain thermal energy storage canisters 28 as best seen in FIG. 2. The construction or configuration of the canisters as well as the physical characteristics thereof will be more fully detailed hereinbelow.

In operation, solar energy (indicated by arrows) impinging upon solar collector 12 is directed into receiver 16 having a fluid conduit system and fluid pumping means (neither shown) such as thermoelectric magnetic pumps, which convey a heated transport fluid (e.g. Li, Na, K, NaK or Xenon-Helium gas) which transport heat from the thermal receiver 16, to the thermal energy storage canisters 28 of storage units 22.

The thermal energy storage canisters include a housing 30, which amy be constructed of cobalt based alloys, or metal such as nickel.

Internal to each canister housing 30 is a hollow axially extending thermally conductive tubular member 42 which may be constructed of metals or alloys such as Nb-1Zr, Hf, Be, Zr, Cr, etc. Tubular member 42 also has an outer surface 44, and is attached at the opposing ends 46 and 48 of the canister 28. In spaced relationship therein are positioned fins 50 extending radially from the outer surface 44 of the conductive tubular member 42 which come into contact with the inner surface 52 of canister housing 30.

Figure 3:
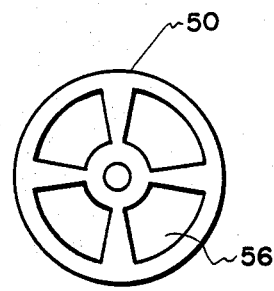
FIG. 3 depicts several possible structural configurations of the fin elements contained within each canister housing.
Figure 3:
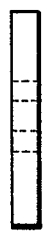
Figure 3:
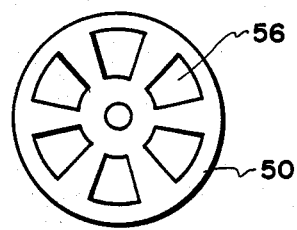
Figure 3:
Figure 3:
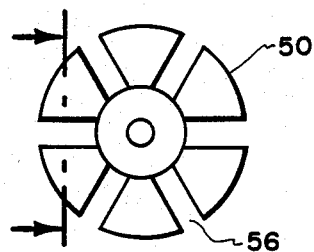
Figure 3:
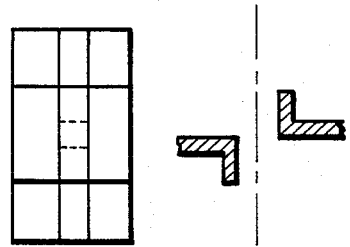
Figure 3:
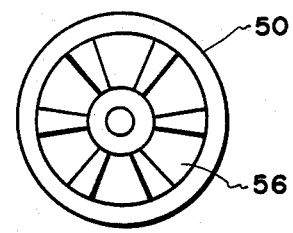
Figure 3:
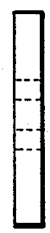
Figure 3:
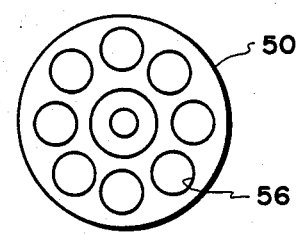
Figure 3:
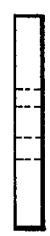

The radially extending fins 50 form annular compartments 54 within canister housing 30 for retaining a heat exchange salt such has LiF, LiF-CaF$_2$, LiF-MgF$_2$, or LiOH therein. As shown in FIGS. 2 and 3 each fin may be perforated or shaped to define communicative openings 56 therethrough and between compartments 54.

A heated transport fluid, as previously noted, is conveyed to and through hollow tubular member 42 associated with each canister 28. This fluid is initially heated in receiver 16 and transported to each thermal energy storage unit by a fluid conduit system.

As the heated fluid flows through tubular member 42, part of the fluid heat is taken up by the phase change salt retained within the housing compartments 54 formed by fins 50. As the space-based solar collector housing power system passes from an in-sun time period to an in-shadow time period during each orbit, the fluid passing through thermally conductive tubular member 42 extracts heat from the phase change salt. The thus heated fluid may then be utilized to function equipment such as a space station heat engine during the in-shadow time period.

The above noted structural design and heat transfer properties of the thermal energy storage canisters and component parts take on added significance due to the reactivity of the phase change salt and the metallic material used to construct each canister housing 30, thermally conductive tubular member 42 and the radially extending fins 50.

Table 1 shows the results of heat transfer enhancement tests comparing a canister without fins and with fins made of copper or nickel metal. For example, in a canister having copper radial fins as compared to one without fins, the heat transfer enhnacement is shown to have increased by a factor of 2.5. In a similar fashion the cooling rate of a canister subsequent to deactivation of the heat source was enhanced by a factor of 1.6.

In addition to enhancing heat transfer and reducing the internal change in temperature ($\Delta T$) in the canister, the heat enhancer and salt purifier according to the present invention also purify the salt contained therein by gettering the trace but harmful impurities in the salt. These trace impurities are typically $O_2$, $H_2O$, carbon and sulfur.

For the fluoride salts such as LiF, LiF-$MgF_2$ and LiF-$CaF_2$, the canister and fins may be constructed of Nb-1Zr, although other metals (Hf, Zr) having an inherent propensity to getter $O_2$, $H_2O$, C, S, etc., may also be utilized.

The final selection of the gettering metal or alloy will depend on the design temperature and environment of the system. The gettering properties of the noted metals are well known as described in the following publications incorporated by reference herein:

1. A. L. Mathews and C. F. Bres, Jr., "Oxide Chemistry & Thermodynamics of Molten LiF-$BeF_2$ Solutions", Inorganic Chemistry, Vol. 7, Issue 2, February 1968.

2. W. M. Phillips and John W. Stearns, "Advanced Latent Heat of Fusion Thermal Energy Storage for Solar Power Systems", Proceedings of the 20th Intersociety Energy Conversion Engineering Conference (IECEC), August 18–23, 1985, Miami Beach, Fla., pp. 2.384–2.391.

Figure 4:
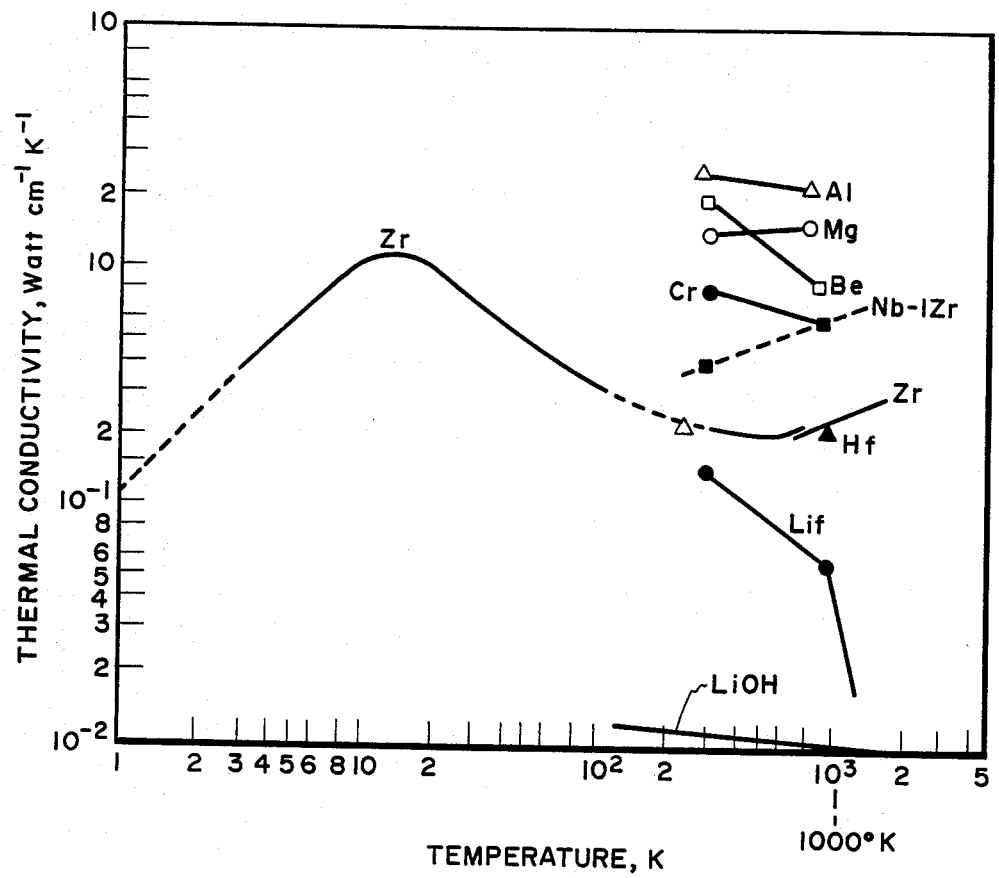
FIG. 4 indicates the thermal conductivities of the metals used in canister construction and a relationship to the thermal energy salts therein.

As indicated in FIG. 4, the thermal conductivities of the metals or alloys used in construction of the enhancer and related parts and the relationship to the thermal energy storage salts is clear. For example, the thermal conductivity of Nb-1Zr is about ten times better than that of LiF salt, and about sixteen times better than that of LiOH salt at 1000° K.

Figure 5:
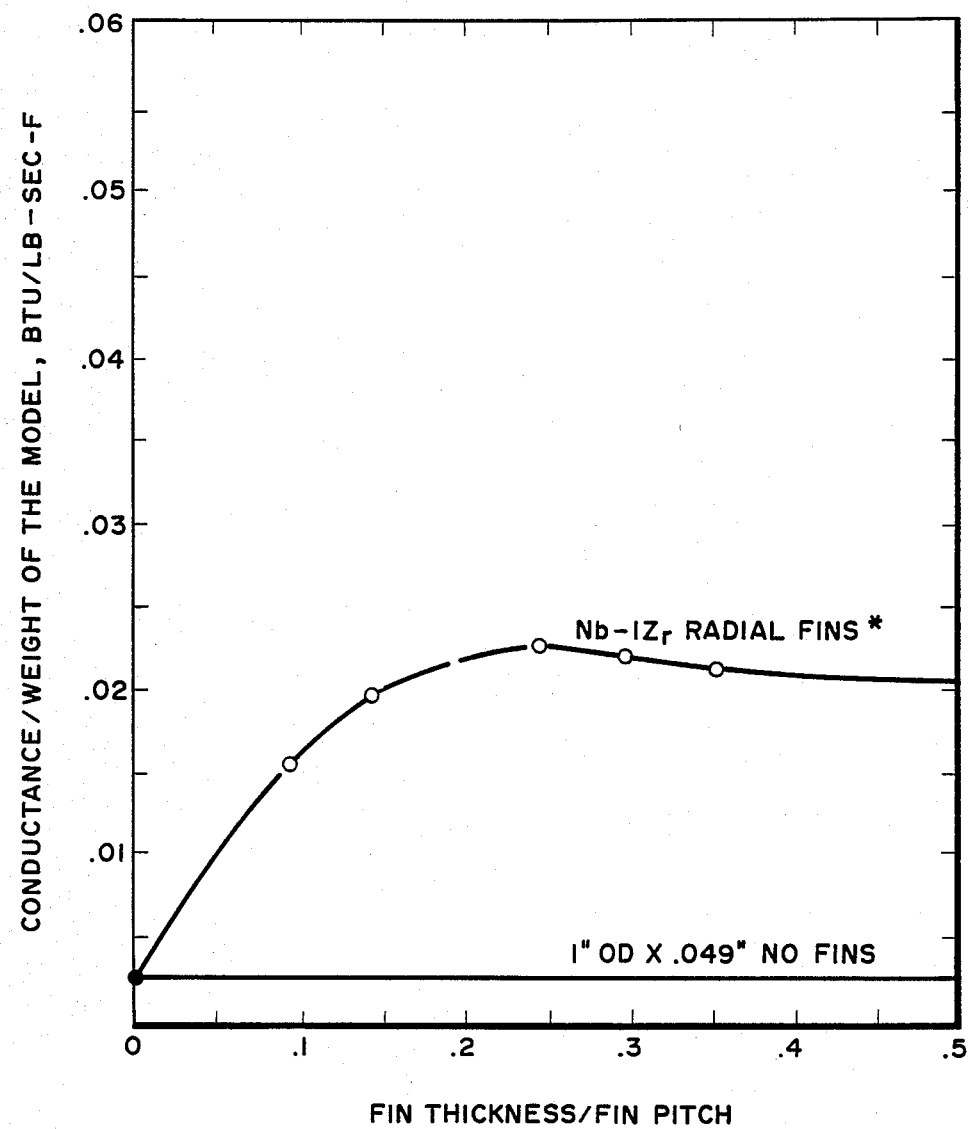
FIG. 5 shows theoretically the enhancement of conductance of Nb-1Zr fin elements.

As shown in FIG. 5, theoretical calculation shows the significant enhancement of the NB-1Zr radial fins in 1"OD×0.049" (wall thickness) canisters.

Obviously, many modifications and variations of the present invention are possible in light of the above concepts. It is therefore to be understood that, within the scope of the appended claims, the invention may be practiced otherwise than as specifically described.

What is claimed and desired to be secured by Letter Patent of the United States is:

1. A method for simultaneous impurity removal and heat transfer enhancement in thermal energy storage units in a space-based solar collector thermal power system, wherein each thermal energy storage unit comprises:

a longitudinal housing;

an internal axially extending thermally conductive tubular member having an outer surface contained within the housing;

spaced radially extending fins on the outer surface of the tubular member;

annular compartments within the housing defined by the radially extending fins;

a phase change salt retained within the housing compartment; and said method consisting of:

(1) constructing the canister and fins of a gettering metal;

(2) retaining a heat exchange salt within the canister housing; and (3) gettering impurities resulting from the interaction of the heat exchange salt and the canister fins.

2. The method of claim 1 wherein said canister fins are constructed from a gettering metal selected from the group consisting of niobium, zirconium, hafnium, beryllium, chromium or alloys thereof.

3. The method of claim 1 in which the heat exchange salt is selected from the group consisting of LiF, LiF-$MgF_2$, LiF-$CaF_2$ and LiOH.

* * * * *